United States Patent [19]

Huder

[11] Patent Number: 5,714,065
[45] Date of Patent: Feb. 3, 1998

[54] FILTER UNIT FOR FLUIDS

[76] Inventor: Marcel Huder, Alpenblick 5, CH-6330, Cham, Switzerland

[21] Appl. No.: 648,164

[22] PCT Filed: Nov. 7, 1994

[86] PCT No.: PCT/IB94/00344

§ 371 Date: Jul. 17, 1996

§ 102(e) Date: Jul. 17, 1996

[87] PCT Pub. No.: WO95/14521

PCT Pub. Date: Jun. 1, 1995

[30] Foreign Application Priority Data

| Nov. 22, 1993 | [CH] | Switzerland | 3490/93 |
| Dec. 17, 1993 | [CH] | Switzerland | 3775/93 |
| Mar. 8, 1994 | [CH] | Switzerland | 673/94 |

[51] Int. Cl.⁶ ............ B01D 29/64; B01D 29/085
[52] U.S. Cl. ............ 210/413; 210/355; 210/266; 210/415; 210/497.3; 210/501; 210/510; 55/296; 55/523
[58] Field of Search ............ 210/413, 414, 210/415, 355, 497.3, 266, 510.1, 501; 55/296, 523

[56] References Cited

U.S. PATENT DOCUMENTS

| 502,690 | 8/1893 | Andre. |
| 1,130,725 | 3/1915 | Getts. |
| 1,382,056 | 6/1921 | Bontemps. |
| 1,510,863 | 10/1924 | Rose. |
| 1,993,214 | 3/1935 | Hass. |
| 2,606,663 | 8/1952 | Blackman. |
| 2,678,732 | 5/1954 | Banks. |
| 4,347,134 | 8/1982 | Suehaug. |
| 5,316,685 | 5/1994 | Stein. |
| 5,569,383 | 10/1996 | Vander Arks, Jr.. |

FOREIGN PATENT DOCUMENTS

| 0450170 | 10/1991 | European Pat. Off.. |
| 0460842 | 12/1991 | European Pat. Off.. |
| 2237663 | 2/1975 | France. |
| 3027997 | 3/1982 | Germany. |
| 3303912 | 8/1984 | Germany. |

*Primary Examiner*—Thomas M. Lithgow
*Attorney, Agent, or Firm*—Speckman, Pauley & Fejer

[57] ABSTRACT

A filter unit for fluids, the filter unit comprising a filter housing with at least one filter disposed therein, at least one fluid feed line, at least one purified fluid outlet line, and at least one unpurified fluid outlet line, each of which lines is provided with a valve. The filter is sealingly seated in the filter housing in an area between the fluid feed line and the purified fluid outlet line. The filter is in the form of a conical cylinder. The wide opening of the filter faces toward the fluid feed line and the underside of the filter forms a narrower opening sealingly disposed in an intermediate plate in the filter housing. A dirt funnel is disposed below the intermediate plate. A cleaning element is rotatably seated inside the filter housing which can be lowered into the filter from a filtration position into a cleaning position.

11 Claims, 3 Drawing Sheets

5,714,065

FILTER UNIT FOR FLUIDS

BACKGROUND OF THE INVENTION

1. Field of the Invention

This invention relates to a filter unit for fluids, said filter unit a filter housing and filters seated therein, at least one fluid feed line, one outlet line for the purified fluid and one outlet line for unpurified fluid, all of which are provided with valves.

2. Description of Prior Art

Filter units of this type have been commercially known for years. Included are the various filter structures for drinking water of Katadyn Produkte AG in CH-8304 Wallisellen. A filter is known from DE-A-30 27 997 which is equipped with a moveable brush. In these drinking water filters the actual filtration is performed with filter elements embodied as hetero-capillary ceramic filters, and having a cylindrical shape. The hollow-cylindrical filter is operated such that the unfiltered drinking water is disposed against the outside of the cylinder surface and flows through the hetero-capillary cylinder wall into the hollow cylinder. The hollow cylinder is filled with silver quartz granules and closed on the top and bottom by a cap, wherein the lower cap has an outlet for the purified drinking water. One or more such ceramic filter elements are fastened on an intermediate plate which is sealingly maintained in the filter housing. Thus, the untreated water is located above this intermediate plate and purified drinking water is located below it. The untreated water contains organic as well as inorganic impurities, which settle on the surface of the ceramic filter element during filtration. So that the filter elements do not become clogged and so that no climate for extreme bacterial growth is created, it is necessary to clean the individual filter elements in regular timed intervals. To do this, it is necessary to stop the filtration operation and hand clean each individual filter element. Accordingly, such drinking water filters are provided with a separate, hydraulically operated cleaning brush mounted on a flexible tube outside the filter housing. When the filter housing is open, the brush is manually placed over each filter element and brushing and rinsing is then performed. Depending on the size of the drinking water filter, it may be necessary to clean up to fifty individual filter elements. This is normally done during normal working hours and therefore leads to corresponding breaks in operation in restaurants, hotels and bottling plants.

The same problems also apply to other fluids. Thus, this invention is not limited to drinking water filtration. Although the structure is described as a drinking water filtration installation in the following description, it can also be utilized without modifications for other fluids.

SUMMARY OF THE INVENTION

Accordingly, it is an object of this invention to provide a drinking water filtration unit which permits a simple cleaning while in operation.

This and other objects of this invention are achieved by a filter unit comprising a filter housing and at least one filter seated therein, at least one fluid feed line, one purified fluid outlet line and one unpurified fluid outlet line, each of said lines being provided with a valve. The filter is sealingly seated in the housing in the area between the fluid feed line and the purified fluid outlet line. The shape of the filter is a conical cylinder, the wide end of which faces the fluid feed line, while the underside with the narrower opening sealingly rests in an intermediate plate in the filter housing. A dirt funnel with an outlet line for untreated fluid is disposed below the intermediate plate. A cleaning element is rotatably seated inside the filter housing and can be lowered inside the conical filter from a filtration position to a cleaning position.

In accordance with one embodiment, purely manual function is provided for use particularly in remote areas and third world countries, where a dependable electrical supply is not assured.

In accordance with another embodiment of the invention fully automatic operation, which permits a purely time-controlled cleaning is provided.

BRIEF DESCRIPTION OF THE DRAWING

These and other features of this invention will be better understood from the following detailed description taken in conjunction with the drawings wherein.

DESCRIPTION OF PREFERRED EMBODIMENTS

Figure 1:
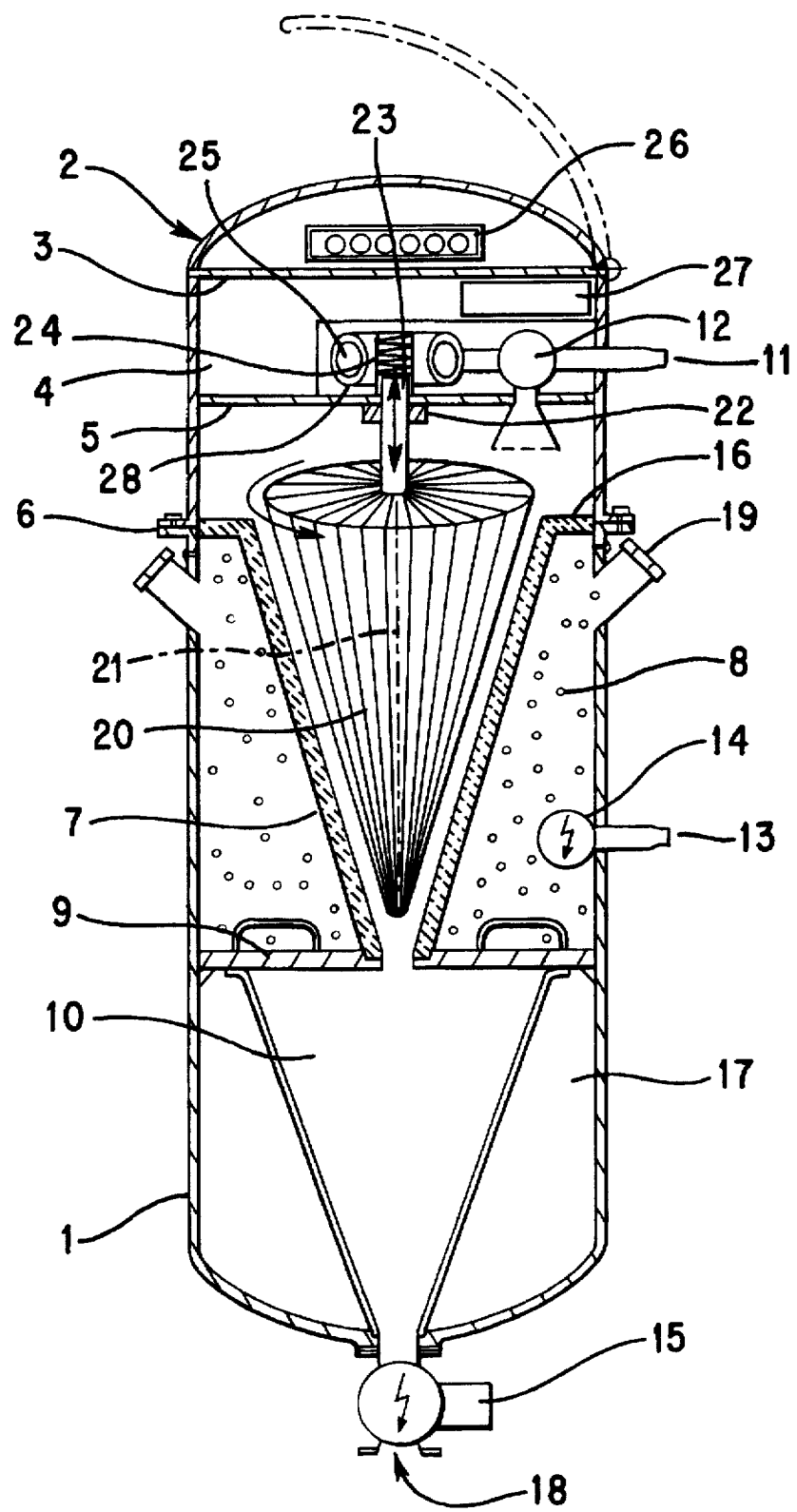
FIG. 1 is a longitudinal section through a filter unit for fluids with automatic cleaning in accordance with one embodiment of this invention.

A filter unit with a single filter is shown in the drawings. It is of course possible using the same principle shown in the drawings to provide filter units with any arbitrary number of ceramic filters designed in the same way. The filter unit for fluids is described in detail in the following description using a filter unit for drinking water as the example.

The size of the drinking water filter unit is determined by the filter housing 1. It is of course possible for several filters to be disposed in the housing. The general design is the same. The filter can be a ceramic filter, a hetero-capillary ceramic filter or any other filter of a relatively solid material. Thus, reference to ceramic filters in this description only represents a preferred form without being limited to it. The filter housing, which can have any arbitrary shape, is divided into different zones by several generally horizontally extending plates. In the area of a flange 6, the entire filter housing 1 is divided into an upper part and a lower part. At the top, the filter housing 1 can be provided with a pivotable cover 2, which provides free access to a control zone. At the bottom, the control zone is bounded by a cover plate 3. The drive zone 4 is located below the cover plate 3 and in turn is bounded toward the bottom by a support plate 5. The actual filtration zone 8 is located below the support plate 5, in which the filter 7 is arranged. The filter 7 rests at its upper edge area on a filter support 16, and at its lower area on an intermediate plate 9. The filter 7 is sealingly maintained in both the filter support 16 and the intermediate plate 9. The drain area 17, in which a funnel 10 for dirty water is disposed, is disposed below the intermediate plate 9. The dirty water funnel 10 terminates in a dirty water outlet 18 at the lower end of the filter housing 1. The dirty water outlet 18 is opened and closed by a dirty water closing valve 15. Depending on its design, this valve can be embodied to be manually or electrically actuable.

The ceramic filter 7 has the shape of a conical cylinder and in accordance with one embodiment is made of hetero-capillary ceramic material. To increase its sturdiness, the ceramic filter can be reinforced by means of a metal or plastic net. In the area between the ceramic filter and the wall surface of the filter housing 1, the filtration zone 8 is filled with an anti-bacterial agent, for example silver quartz granules, between the filter support 10 and the intermediate plate 9. The silver quartz granules are introduced into the filter housing 1 through the filler neck 19. The untreated water to be purified is introduced into the drive zone 4 through the untreated water connector 11 and from there is introduced through a mechanically or electrically controllable reversing valve into the filtration zone 8. In this case, the dirty water closing valve 15 is closed and the inflowing untreated water fills the dirty water funnel 10 as well as the conical cylinder of the filter 7 at most up to the area just below the support plate 5. The untreated water is disposed against the inner wall surface of the filter 7 and penetrates the filter 7 until it reaches the area between the ceramic filter and the filter housing. From this area, it can flow out through the drinking water outlet 13 as purified drinking water. The drinking water outlet 13 is provided with a closing valve 14, which can be manually or electrically actuated. If the closing valve 14 is electrically actuable, it can also be disposed inside the filter housing. It is, of course, also possible to dispose the closing valve 14 outside of the filter housing 1. In a particularly simple embodiment of the drinking water filter, the untreated water connector 11 is introduced into the filtration zone 8 directly underneath the support plate 5 and above the filter support 16. In this case, the reversing valve 12 is omitted and a simple closing valve attached outside of the filter housing 1.

Because the filter 7 is used here in such a way that the untreated water is disposed against the interior surface of the conical cylinder, organic and inorganic dirt particles will correspondingly be deposited there, too. A cylindrical brush 20 is accordingly, thus, in the filter housing 1, whose central rotational shaft 21 passes through the support plate 5 and is rotatably held in a bearing 22. The shape of the cone-shaped brush 20 is such that it can be exactly received in the conical cylinder shape of the ceramic filter 7. So that the brush does not continuously rest on the filter 7 and thus affect its function, the brush 22 is held, movable in the axial direction, in the bearing 22 and in the support plate 5. In the filtration position, the brush 20 is in an upper position in which it does not come into contact with the ceramic filter, while the brush is moved downward in a cleaning position so that it comes into intimate contact with the filter 7. In this position, the brush is rotated. This can occur in a simple manner either manually (see FIG. 2) or, as represented in FIG. 1, by means of the applied water pressure.

In accordance with the embodiment shown in FIG. 1, the brush 20 is maintained in an upper position, the filtration position, by a spring 34 which acts on shaft 21. Spring 24 is designed as a tension spring or, in a known force reversing construction, as a pressure spring. When the brush 20 is to be brought into the cleaning position, the lower position, the reversing valve 12 is reversed so that, on the one hand, the prevailing water pressure above the rotational shaft 21 presses thereon and brings the brush 20 into the cleaning position against the force of the spring 24. To this end, the drive shaft 21 is seated in a closed bushing used as a hydraulic cylinder 23. Thus, it is assured, due to a controlled leak between the hydraulic cylinder 23 and the drive shaft 21 acting as a piston, that, with the pressure removed at the end of the cleaning process and correspondingly by reversing the reversing valve 12, the water can escape from the hydraulic cylinder 23 under the effect of the spring 24 and the brush again reaches the upper filtration position. The main stream of the untreated water is guided through the reversing valve 12 on a water turbine 25, whose symbolically represented outlet 28 guides the untreated water through the support plate 5 into the filtration zone 8. The cleaning brush 20 now rotates, scrubbing the impurities off the inner wall of the surface of the ceramic filter 7, while simultaneously the water flowing out of the water turbine 25 flushes these impurities away, during which they reach the dirty water funnel 10 below the intermediate plate 9. The dirty water valve 15 is of course opened during this time, so that the dirty untreated water can flow off. During this cleaning process, the drinking water outlet 13 can in principle remain open, because the filtration function is not qualitatively affected even during the cleaning process. However, during the cleaning process a portion of the purified drinking water will flow from the area between the outer wall surface of the filter 7 and the filter housing 1 in the reverse direction through the filter and partially empty it. To prevent air from reaching the downstream drinking water pressure lines, the closing valve 14 can be closed. The closing of the valve 14 can be controlled by a water level sensor, for example.

When the cleaning process is completed, for example, after approximately two to three minutes, the reversing valve 12 is turned back into the filtration position and the untreated water again reaches the filtration zone directly. Simultaneously, the spring 24 pulls the brush 20 back into the filtration position and the dirty water closing valve 15 is closed. If the closing valve 14 has been closed during the cleaning process, it is also opened again. The cleaning cycle is thus completed.

The cleaning process can be automated to prevent interruptions in the operation, to which end an electric control 26 is disposed under the cover 2 on the cover plate 3, which automatically controls the process, for example through an integrated or external circuit. In accordance with this embodiment, the valves 12, 14 and 15 are electrically actuable. The electrical supply and possibly a transformer are accordingly housed in a water-tight and insulated box 27.

Figure 2:
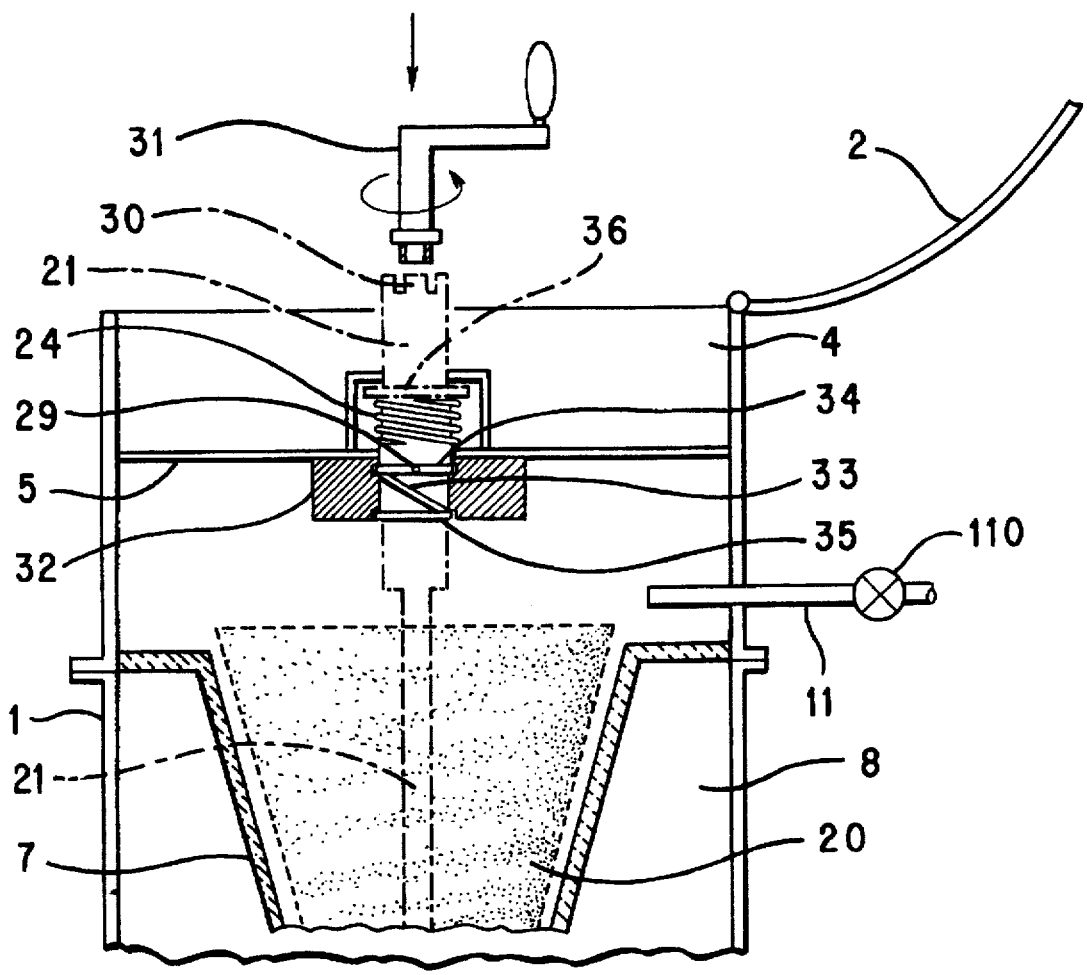
FIG. 2 is a partial section of the drive section of a filter unit in accordance with one embodiment of this invention, which is intended for manual operation.

In remote areas with unreliable supply of electrical power, it may be desirable to offer a solution which is manually operated to a large degree or completely. This is easily possible with the embodiment in accordance with the invention in that the various valves can be manually operated. In this case, too, the two movements of the brush are actuated by the prevailing water pressure. However, if the degree of purity of the untreated water is very low, it is possible that a solution employing the water pressure can be prone to trouble. In this case, the movements of the cleaning brush 20 are also performed manually. This embodiment is shown in FIG. 2 in a partial section only in regards to the actuation. The filter housing 1 is represented in a sectional view, wherein only a portion of the filtration zone 8 and the drive zone 4 can be seen. The cover 2 is represented in the flipped open state. As already mentioned, the untreated water connector 11 is directly introduced into the filtration zone 8. In place of the reversing valve 12 of the drive zone 4, a simple, manually operable closing valve 110 is used, which is disposed outside of the filter housing 1. The drive shaft 21 of the cleaning brush 20, which dips into the filter 7, passes through the support plate 5, on the underside of which a bearing 32 is disposed. A carrier bolt 29 passes through the rotational shaft 21 and extends radially from the rotational shaft 21. This carrier bolt 29 engages a guideway in the bearing 32. The guideway is divided into three sectors, namely an upper, circular-shaped track 34, a lower, circular-shaped track 35 and a helically wound track 33, which connects the two circular tracks 34 and 35 to each other. A spring 24 is provided which pushes the cleaning brush 20 into an upper filtration position. The spring 24, which here is embodied as a pressure spring, rests directly on the support plate 5 and presses against a collar 36, which is fixedly connected with the drive shaft 21. At the upper end, the drive shaft 21 is provided with a square or hexagon socket 30, for example, into which a hand crank 31 can be inserted. If pressure is put on the crank and it is simultaneously turned counterclockwise, the carrier bolt 29 in the corresponding angular position is pushed into the helical guideway and turns as far down as the lower cleaning position, wherein the carrier bolt 29 then runs in the lower circular guide surface 35, while the pressure spring 24 is tensed and the brush 20 rests on the filter 7. If after some revolutions the ceramic filter 7 is sufficiently cleaned, it is only necessary to change the direction of rotation of the crank 31, wherein the spring 24 again presses the carrier bolt 29 into the helical guideway 33 when the corresponding angular position has been reached and from there is screwed upward until it again extends in the upper ring-shaped guideway 34. Following cleaning, the crank 31 can be removed and placed on the support plate 5, after which the cover 2 can be closed. The remaining valves, not illustrated here, can be opened and closed in an absolutely analogous manner as in the automated version.

Figure 3:
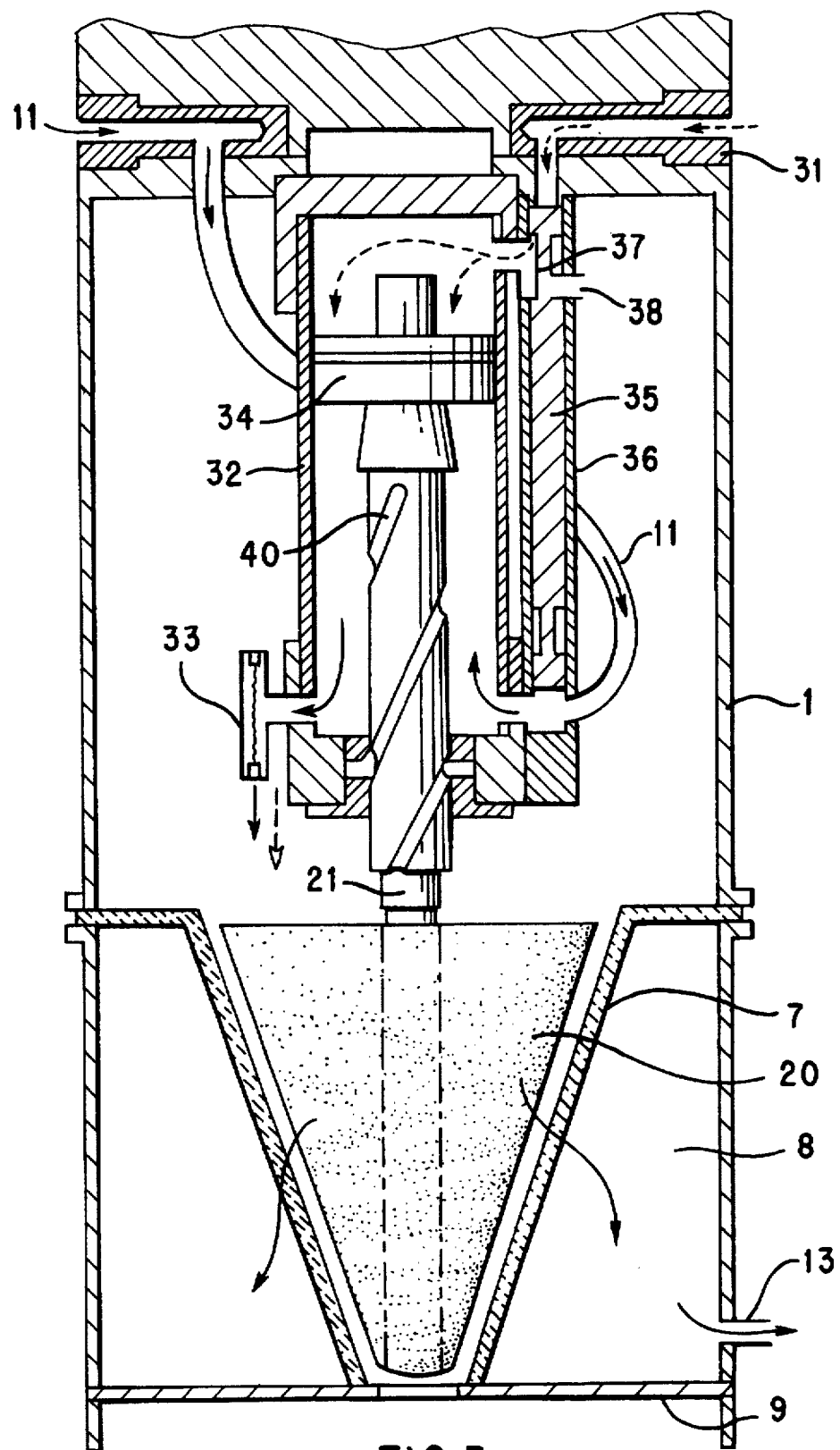
FIG. 3 is a partial section of the filter unit in the drive section, which can be actuated by the exerted pressure of a fluid, but operates without a turbine.

Brush actuation in accordance with another embodiment of this invention is shown in FIG. 3. The unpurified liquid, for example, the untreated water, is supplied to the filter unit through a valve, not shown, directly through the feed line 11 or through an actuating line connector 11'.

Here, too, the brush 7 is moved up and down in a translatory manner and made to rotate. During normal filter operations, the fluid to be purified is supplied through the line 11 and flows into the cylinder 42 which is emptied at the bottom through a pressure control valve 43. A piston 44 which is acted upon on both sides is movably seated in the cylinder. During filter operation, the piston 44 in the cylinder 42 is pushed upward. The direction of the flow is represented by solid arrows. After the water has passed through the pressure control valve 43, the further process corresponds to the one described so far.

However, if the water pressure is moved to the connector 11', a control piston 45 which extends parallel with the actuation cylinder 42, is moved downward in a control cylinder 46. It therefore opens the actuation line 47 and the fluid flows in the area above the piston 44, as shown by dashed lines.

The piston 44 is pushed downward, the water below the piston is emptied through the pressure control valve 43 and the drive shaft 21, which is seated in the piston 44, is moved downward and simultaneously caused to rotate by means of the screw thread 40. So that cleaning takes place during the downward movement already, the drive shaft 21 is embodied to be secure against twisting within itself and telescopic.

When the piston 44 has been completely pushed down, the brush 20 is stationary and the fluid cannot flow out unnecessarily. When the pressure of the liquid is again applied through the line 11, the control piston 45 is moved upward. The piston 44 is pressed upward by the inflowing fluid, while the fluid present above the piston 44 can flow out through the pressure control line 48 because the control piston 45 now releases this passage. Accordingly, the feed lines 11 and 11' are therefore alternatingly controlled for cleaning in order to achieve the desired cleaning effect.

The basic principle of the invention particularly rests in the conical shape of the filter, as a result of which the cleaning brush 20 can be moved from an inactive filtration position over a small stroke path into an active cleaning position. Another condition of course is that the filter be open at the bottom, so that the dirt particles can be removed at the bottom. This has the additional advantage that larger, slightly heavier dirt particles do not remain in the filter area during the filtration process.

I claim:

1. In a filter unit for fluids, said filter unit comprising a filter housing (1) and at least one filter (7) seated therein, at least one fluid feed line (11), at least one purified fluid outlet line (12, 14, 15) and at least one unpurified fluid outlet line (13, 18), each of which is provided with a valve, the improvement comprising; the filter (7) sealingly seated in the filter housing (1) in an area (8) between the at least one fluid feed line (11) and the at least one purified fluid outlet line and having a conical shape, a wide opening of said conical filter facing the at least one fluid feed line, an underside of said conical filter with a narrower opening sealingly disposed in an intermediate plate in the filter housing (1), a dirt funnel (10) with the at least one unpurified fluid outlet line (18) disposed below said intermediate plate (9), and a cleaning element (20) rotatably mounted inside the filter housing (1), means for rotating said cleaning element and means for moving the cleaning element from a filtration position in which the cleaning element does not engage the conical filter to a second cleaning position in which the cleaning element engages the conical filter.

2. A filter unit in accordance with claim 1, wherein the means for moving comprises manually operable means for moving the cleaning element from the filtration position into the cleaning position against a force of a spring and said means for rotating comprises a crank (31).

3. A filter unit in accordance with claim 1, wherein the cleaning element is sealing seated in a support plate (5) above the conical filter (7).

4. A filter unit in accordance with claim 3, wherein a bearing (32) of the cleaning element (20) forms a helical crank guide (33), out of which the cleaning element (20) can be returned by turning in one direction into a lower cleaning position and by turning an opposite direction into the filtration position by a spring force.

5. A filter unit in accordance with claim 1, wherein the means for moving comprises hydraulic means driven by the prevailing pressure of the fluid to be purified.

6. A filter unit in accordance with claim 1, wherein a controllable reversing valve (12) is disposed inside the filter housing (1) in the fluid feed line (11) by which in the filtration position the fluid is directly introduced into the filter (7), while in the cleaning position of the reversing valve (12), the unpurified fluid is routed over a hydraulic turbine (25), which rotatingly drives the cleaning element.

7. A filter unit in accordance with claim 6, wherein the reversing valve (12) guides the pressure of the fluid to be purified to a piston cylinder (23) disposed above a rotary shaft (21) of the cleaning element (20), which pushes the cleaning brush (20) into the filter (7) from the filtration position into the cleaning position.

8. A filter unit in accordance with claim 1, wherein the valves (12, 14, 15) are electrically controlled.

9. A filter unit in accordance with claim 1, wherein the intermediate plate (9) in the filter housing (1) is removably seated.

10. A filter unit in accordance with claim 1, wherein the pressure of the fluid to be purified can be selectively directed to the at least one fluid feed line (11) or an actuating connector (11'), through which the fluid is present above or below a piston (34) and moves said piston (34) up and down, along with the cleaning element (20) indirectly fastened on it.

11. A filter unit in accordance with claim 10, wherein the cleaning element (20) is seated on a telescopic shaft (21), which is secure against twisting, and has an exterior screw thread (40) and can be scanned and thus puts the brush into rotary movement during the downward movement.

* * * * *